United States Patent
Havn

(10) Patent No.: US 6,279,617 B1
(45) Date of Patent: Aug. 28, 2001

(54) CORROSION-PROTECTED METAL CONSTRUCTION IN THE FORM OF A PIPELINE

(75) Inventor: Torfinn Havn, Stavanger (NO)

(73) Assignee: Aker Offshore Partner AS, Stavanger (NO)

( * ) Notice: Subject to any disclaimer, the term of this patent is extended or adjusted under 35 U.S.C. 154(b) by 0 days.

(21) Appl. No.: 09/554,565

(22) PCT Filed: Nov. 11, 1998

(86) PCT No.: PCT/NO98/00335
§ 371 Date: Jun. 30, 2000
§ 102(e) Date: Jun. 30, 2000

(87) PCT Pub. No.: WO99/25899
PCT Pub. Date: May 27, 1999

(30) Foreign Application Priority Data

Nov. 17, 1997 (NO) ........................................ 975253

(51) Int. Cl.⁷ ........................... F16L 9/22; C23F 13/06
(52) U.S. Cl. ...................... 138/155; 138/109; 204/196
(58) Field of Search ............................. 138/155, 120, 138/109; 204/196.1

(56) References Cited

U.S. PATENT DOCUMENTS

| 3,616,421 | * 10/1971 | Mackintosh | 204/197 |
|---|---|---|---|
| 4,216,070 | 8/1980 | Debost | 204/197 |
| 4,284,488 | * 8/1981 | Brittain et al. | 204/197 |
| 4,370,211 | * 1/1983 | Hybler | 204/148 |
| 4,692,231 | * 9/1987 | St. Onge | 204/197 |
| 4,749,627 | 6/1988 | Ishikawa et al. | 428/654 |
| 5,362,921 | * 11/1994 | Birkelund et al. | 138/110 |
| 5,910,236 | * 6/1999 | Iossel et al. | 204/280 |

FOREIGN PATENT DOCUMENTS 1564621  4/1980  (GB).

* cited by examiner

Primary Examiner—Patrick Brinson
(74) Attorney, Agent, or Firm—Andrus, Sceales, Starke & Sawall, LLP

(57) ABSTRACT

An account has been given for corrosion-protection of metal constructions, e.g. in the form of a pipeline consisting of interconnected pipelines (10, 10a, 10b, 10c, 10d) and, possibly, incorporatable in a larger pipe system. Said metal construction is, for purpose of corrosion-protection, assigned one or more sacrificial anodes in the form of one or more bodies made of a metal or a metal alloy which is less noble than the metal to be corrosion-protected. In order to utilize the sacrificial anode(s) beyond its corrosion-protecting ability within said construction, said one or more sacrificial anode bodies are included in the metal construction as at least one functional part thereof, e.g. in the form of at least one pipe length (10).

5 Claims, 1 Drawing Sheet

CORROSION-PROTECTED METAL CONSTRUCTION IN THE FORM OF A PIPELINE

BACKGROUND OF THE INVENTION

The present invention relates to a corrosion-protected metal construction, e.g. a steel pipeline system, a pump structure, an outboard marine engine or, insofar, any metal construction or structure of the kind often corrosion-protected through the assignment of one or more sacrificial anodes.

To combat corrosion, corrosion-protective measures are often taken. Such a step could consist in the use of sacrificial anodes. Another measure is the use of corrosion-resistant (stainless) high-quality steel. The use of high-quality steel, such as Titan or Duplex, is, however, very expensive.

When using sacrificial anodes well known constructively and functionally in connection with metal structures, bodies, termed sacrificial anodes, are used in the form of metal pieces made from a metal which is less noble in relation to the metal to be protected, and which connects to metal structures subsea or in moist environment above water, in order to protect the metal structure against corrosion.

Sacrificial anodes are usually made from zinc, aluminium or magnesium alloys. They are consumed through anodic solution. During its corrosion-protecting action towards the metal construction, the sacrificial anode(s) is/are consumed.

SUMMARY OF THE INVENTION

According to the present invention, this utilisation of sacrificial anodes as corrosion-protecting bodies is considered as insufficient and, thus, unsatisfactory, particularly with a view to their relatively short functional time before they are consumed.

Therefore, the object of the invention has been to indicate a better utilisation of sacrificial anodes used as corrosion-protecting bodies in metal constructions, steel pipeline systems, pumps, valves, outboard engines of aluminium, etc.

According to the invention, this object is realised by means of a sacrificial anode assigned to the metal construction, etc., of the kind as defined in the claims and which, moreover, distinguishes itself through the features also defined in the claims.

Substantially, the invention consists in that sacrificial anode body or bodies, respectively, disposed in association with said metal construction, etc., for corrosion-protecting purposes, is formed as and is included in the metal construction as a functional part thereof. In a pipe system, e.g. consisting of a plurality of interconnected pipe sections, each of the sacrificial anode bodies may be formed as a pipe section included in the pipe system, insofar as the remaining pipe section of special steel (noble metal). Then, the constructions of special steel will be protected against corrosion by means of sacrificial anode bodies formed as pipe sections.

Usually, the sacrificial anode pipe sections are regularly distributed along the length of a pipeline built up through the interconnection of special (noble) steel pipe sections and sacrificial anode pipe sections, the latter, ordinarily, appearing in a substantially smaller number than the number of special steel pipe sections.

In accordance with the invention, the sacrificial anode body is a multipurpose-means, where its corrosion protecting properties towards a metal construction are utilised in a well known manner, where the metal in the original construction is more noble than the metal from which the sacrificial anode bodies is made, simultaneously as each of said bodies is included in the metal construction as a functional part (a pipe section) thereof.

In pipelines/systems built up in accordance with the invention and e.g. consisting of pipe lengths of steel of the type 316L SS (relatively cheap special steel), and in the pipeline regularly inserted pipe lengths of carbon steel as sacrificial anodes, very large savings can be achieved, the carbon steel functioning as sacrificial anode and, thus, preventing that the more noble metal, steel, corrodes.

Connecting flanges between noble steel and carbon steel (or zinc alloy) may be electrically divided with an electric resistance between said flanges. This electric resistance can be a plastic package having an appropriate electric resistance value. Such a package would be producible from a material consisting of polyester admixed carbon powder.

The pipe lengths of precious steel will be protected against pitting, spot and crevice corrosion. In addition to its corrosion-protecting effect towards the precious steel pipe lengths, the sacrificial anodes in such a pipeline/system have the obvious additional function that they are fluid conveying in the same way as the other pipe lengths. In immersed devices such as e.g. pumps which, in prior art designs and structures, are connected to a sacrificial anode in the form of a metal piece, the latter may be shaped and designed as a functional pump part, e.g. as a housing or a cover included in the remainder of the pump structure, to which it is connected.

The invention is further explained in the following in connection with a non-limiting exemplary embodiment in the form of a fluid conducting, corrosion-protected pipeline built up of interconnected pipe lengths and includable in a larger pipe system.

BRIEF DESCRIPTION OF THE SEVERAL VIEWS OF THE DRAWINGS

Reference is made to the accompanying drawing, in which.

DETAILED DESCRIPTION OF THE INVENTION

Figure 1:
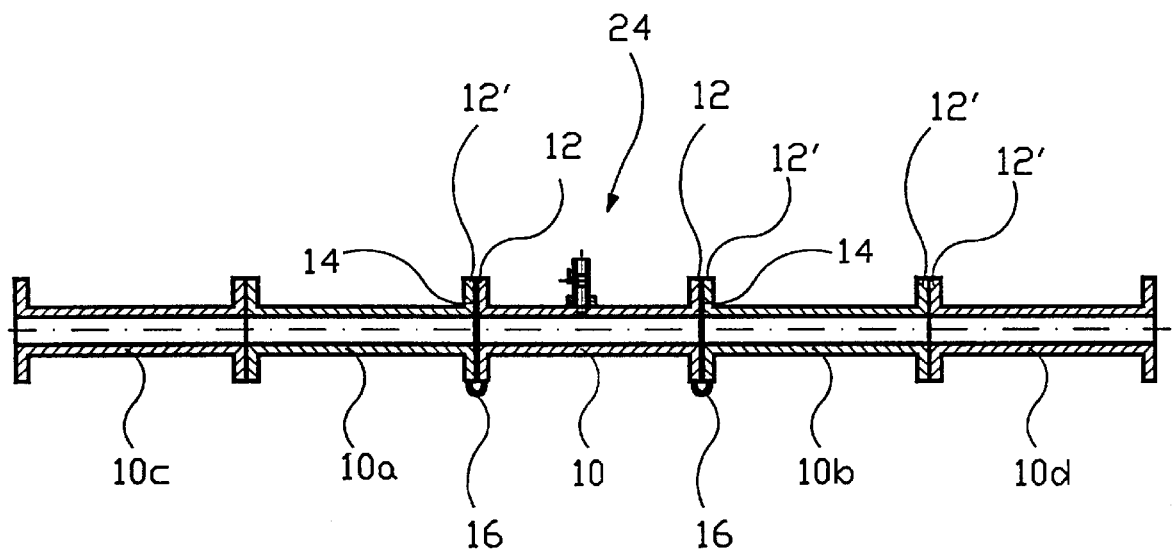
FIG. 1 shows an axial section through a rectilinear, longitudinal portion of said pipeline, in which one pipe length constitutes a sacrificial anode.

In FIG. 1, of an elongated pipeline includable into a larger pipe system, only a short portion of the pipeline has been shown, comprising five interconnected pipe lengths, of which the central one is a sacrificial anode formed as a flange pipe 10 (preferably of carbon steel). At each end thereof, the flange pipe 10 is coupled to an ordinary flange pipe 10a and 10b respectively of stainless steel (preferably of the steel type 316L SS). At the outer ends, these rust-proof steel pipes 10a and 10b are each coupled to a further flange pipe 10c and 10d, respectively, each of rust-proof steel. Then, the latter are, at the outer ends thereof, coupled to further pipes (not shown) which may be stainless steel pipes or sacrificial anode pipes such as 10. In a long pipeline, there will be several sacrificial anode pipes present therein, preferably regularly distributed along the pipeline length.

In order that the sacrificial anode pipe length 10, at such a positioning in the pipeline as shown in the exemplary embodiment, shall exert its corrosion-protecting effect to both sides, i.e. to the same extent towards the adjacent pipe lengths 10a,10c and 10b,10d, electrically insulating annular packings 14 are mounted in between adjacent annular end flanges 12 belonging to the pipe 10 and end flanges 12' belonging to the rest of the pipes. An electric conductor 16 establishes connection between the pipe length 10 and adjacent pipe lengths. The packings 14 constitute electric resistances between the pipe 10 constituting the sacrificial anode and its adjacent pipes 10a, 10b and reduce, thus, galvanic corrosion in the pipe 10.

Figure 2:
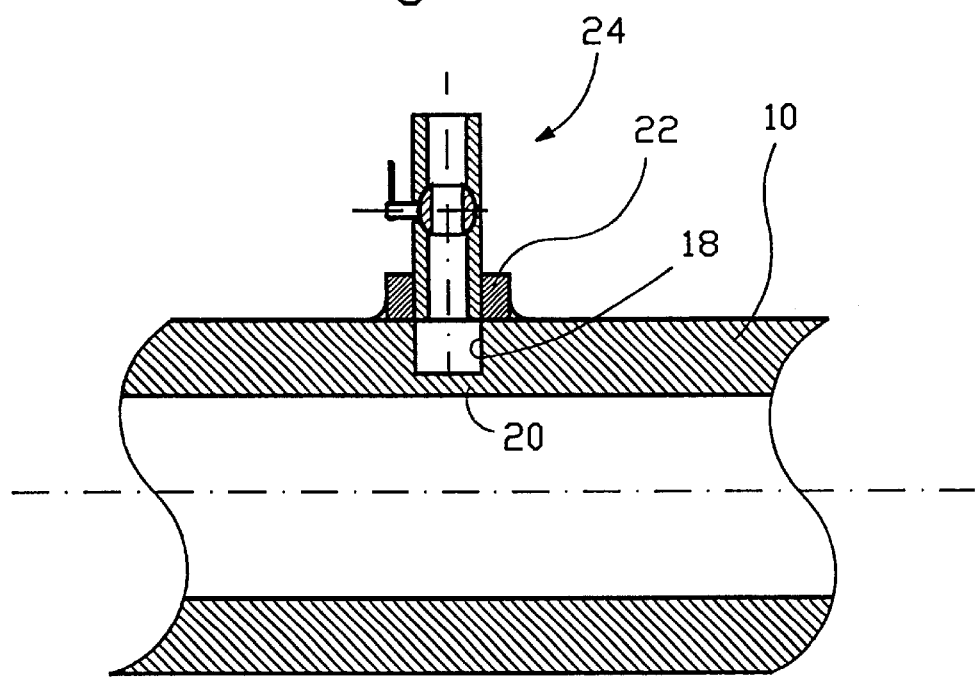
FIG. 2 shows, on a considerable larger scale, a portion of a sacrificial anode pipe length and an assigned indicator transmitting a warning signal when a substantial portion of the sacrificial anode pipe length has corroded away.

Reference is made to FIG. 2 showing a portion of the pipe length 10 in FIG. 1 in axial section and greater scale.

In order to acquire knowledge of those corrosion attacks to which the sacrificial anode pipe length 10 is subjected in the form of a pipe wall thickness reduction in good time before the sacrificial anode pipe length 10 has become so thin-walled that it has to be replaced by a new sacrificial anode pipe length, a weakening has been formed in the wall of the pipe length 10, namely in the form of a non-through-going bore (blind hole) 18 with a radially inwardly positioned, thickness-reduced pipe wall portion 20. The radially outermost positioned mouth of the blind hole 18 at the pipe mantle face is surrounded by a socket 22 welded to the pipe length 10 and accommodating a shut-off valve 24, e.g. in the form of a ball valve.

When corrosion has eaten away the portion 20 radially inwardly of the bore 18, so that the latter becomes through-going in radial direction, the conveyed seawater, etc., will squirt out through the ball valve 24 which, during operation occupies an open position of readiness. When water squirts out through the valve 24, the latter is closed, so that the plant is sealed and tight again. The blind bore 18 may have a depth corresponding to several years corrosion attack before a real leakage could arise. Consequently, one has plenty of time to replace the sacrificial anode pipe length 10 on an adequate occasion.

What is claimed is:

1. A corrosion-protected metal construction in the form of a pipeline comprised of interconnected pipe lengths (10, 10a, 10b, 10c, 10d), wherein said metal construction, for the purpose of corrosion-protection, includes one or more sacrificial anodes in the form of one or more bodies of a metal or metal alloy which is less noble in relation to the more noble metal of the pipe lengths to be corrosion-protected, said sacrificial anode comprising a functional part of the metal construction in the form of a length of carbon steel pipe, the steel to be protected in the construction comprising stainless steel which is noble in relation to carbon steel, and wherein an electrical resistor (14) has been disposed between the pipe length (10) comprising the sacrificial anode and adjacent pipe lengths (10a, 10b).

2. A corrosion-protected metal construction as set forth in claim 1, characterized in that, in a sacrificial anode pipe length (10) is formed a pipe wall thickness reduction in the form of a non-through-going bore (18), where a radially inwardly positioned pipe wall portion (20) thereof has a substantially less pipe wall thickness than full pipe wall thickness in the sacrificial anode pipe length(s) (10).

3. A corrosion-protected metal construction as set forth in claim 2, characterized in that the pipe wall thickness reduction in the form of a non-through-going bore (18) externally is assigned a shut-off valve (24).

4. A corrosion-protected metal construction as set forth in claim 1, characterized in that said electric resistor is shaped and designed as and, simultaneously, serves as packing (14) between pipe length(s) (10) comprising a sacrificial anode and adjacent pipe lengths (10a, 10b).

5. A corrosion-protected metal construction as set forth in claim 1, and where the pipeline's pipe lengths (10, 10a, 10b, 10c, 10d) have annular end flanges 912), the opposed end faces thereof are kept separated by means of annular packings (14), neighboring pipe flange portions being interconnected by means of electric conductors (16).

* * * * *